US006297822B1

(12) United States Patent
Feldman

(10) Patent No.: US 6,297,822 B1
(45) Date of Patent: *Oct. 2, 2001

(54) RESULTS-ORIENTED HELP DISPLAYS FOR COMPUTER SOFTWARE PROGRAMS

(75) Inventor: Sabra M. Feldman, Colorado Springs, CO (US)

(73) Assignee: Sun Microsystems, Inc., Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 2 days.

(21) Appl. No.: 09/223,204

(22) Filed: Dec. 30, 1998

Related U.S. Application Data

(62) Division of application No. 08/626,726, filed on Apr. 1, 1996, now abandoned.

(51) Int. Cl.[7] .................................................. G06F 7/00
(52) U.S. Cl. .................................... 345/336; 345/338
(58) Field of Search ................................ 345/329, 333, 345/334, 338, 339, 336, 346, 347

(56) References Cited

U.S. PATENT DOCUMENTS 5,535,422 * 7/1996 Chiang et al. ..................... 345/338
5,600,779 * 2/1997 Palmer et al. ..................... 345/340

* cited by examiner

*Primary Examiner*—Raymond J. Bayerl
*Assistant Examiner*—Cao H. Nguyen
(74) *Attorney, Agent, or Firm*—Hogan & Hartson LLP

(57) ABSTRACT

Special bit-mapped images, or buttons, are programmed to display in a primary topic window of an on-line help system when a result or warning may be helpful to the user. The user can choose whether or not to click a pointing device, such as a mouse on the bit-mapped image. Clicking the pointing device on the bit-mapped image will pull up the expected result or warning in either a secondary topic window or pop-up, either of-which can be closed when the information has been reviewed. Such an organization of help information in multiple windows provides users with access to information that may be useful and even essential, without cluttering the primary topic window and decreasing user productivity.

19 Claims, 5 Drawing Sheets

RESULTS-ORIENTED HELP DISPLAYS FOR COMPUTER SOFTWARE PROGRAMS

This application is a division of Ser. No. 08/626,726 filed Apr. 1, 1996 now abandoned.

BACKGROUND OF THE INVENTION

1. Field of the Invention

This invention relates to graphical user interfaces (GUIs) for computing systems and to methods and techniques for providing help to the user during the running of application programs on a computing system.

2. Description of Related Art

As graphical user interface (GUI) operating system environments have come to dominate the computer industry, on-line help documentation (hereinafter referred to as an On-line Help System) is-generally implemented in a GUI environment. Many GUI environments, such as Microsoft® Windows™ ver. 3.X, Microsoft Windows 95, Windows NT®, IBM Corporation's OS/2®, and Geoworks® have been developed. As this is written, Microsoft Windows ver. 3.X is far and away the most used interface, having been bundled within nearly every personal computer sold within the past five years. However, Windows 95 is expected to become the GUI of choice for both home and business applications and may eventually eclipse ver. 3.X as the most used GUI interface. GUIs generally have the following common characteristics:

- A graphical pointer or cursor is present within each window displayed;
- The pointer or cursor can be moved to any location within the window by moving a pointing device, such as a mouse;
- Movement of the pointer or cursor tracks movement of the pointing device;
- Commands to the program may be input through either a keyboard or through the pointing device;
- Certain bit-mapped images and/or text items are assigned "hot" status, which means that such an image or item may be activated in order to send a command to the program;
- Input via the pointing device is accomplished by moving the pointer or cursor so that it is positioned over a "hot" bit-mapped image or text item, and pressing a particular button on the pointing device. Such input is known as clicking.

An On-line Help System operating in a Windows environment incorporates a "help engine," which is a software program module designed to understand requests for action from the On-line Help System. The Microsoft Windows 95 operating system incorporates a help engine program module called "WinHelp 4".

Requests for action from the On-line Help System are input by activating "hot" bit-mapped images or text items (hereinafter collectively referred to as activation entities) to which help engine program links are assigned. When a user clicks on an activation entity which is programmed to request such action, the On-line Help System calls the help engine, which responds by displaying a new window.

Two types of video monitor display formats, which are called "windows" are available within the Microsoft Windows GUI On-line Help System: topic windows and pop-ups. Both types of windows may be utilized by developers of an On-line Help System written for a Microsoft Windows GUI environment.

A topic window is a standard, fully-functional window which has a title bar, and which can be closed by clicking a "close window" icon located within the title bar once the user has reviewed the desired information.

A pop-up, on the other hand, is an on-line graphical box that temporarily displays information when a user clicks on an activation entity. Pop-ups, which are sometimes called pop-up boxes or pop-up windows, generally displace only a portion of the topic window. A pop-up can generally be closed simply by clicking anywhere outside the pop-up box in the undisplaced portion of the topic window, thus fully restoring the latter.

Designers of the On-line Help System rely on the use of pop-ups to keep a secondary level of information which a user may or may not want to access out of the main help windows of the On-line Help System. By moving this information to an accessible and less visible layer of the On-line Help System, designers of such systems can:

- Reduce the amount of text displayed in a topic window;
- Cater to a wider variety of users: those who want to access the secondary information, as well as those who do not want to access the secondary information;
- Replace a formidable-looking, lengthy tract of information that users might choose not to read in the main help window with an attractive, easily-accessible button that a user would want to click. The same information that looks oppressive in a main window appears convenient and pleasant in a pop-up.

The user of a computer program undergoing execution by a computing system is frequently required to provide an input in response to a displayed instruction for each step of a series of procedural steps. If written documentation provided with the program lacks a description or graphical representation of the result of each step as it is completed, the user can only hope that each input is correct and that the program is operating as designed. Classic examples of multi-step procedures are-found in software installation programs. As the installation process is likely the user's first encounter with the software, confusion, uncertainty, frustration, and even anger may result if the process does not proceed smoothly. Frustration is typically heightened if the installation program "crashes", or the resulting installed software fails to function as designed by its developers. If users don't know what to expect as the result of a particular installation step, they may be apprehensive about proceeding with subsequent steps.

To mitigate the difficulties that users often face during the operation of their programs, instructional documentation may be provided with a software product in the form of hard-copy manuals and on-line help. Hard copy documentation may provide either a textual description of the result of each step of a procedure or an illustration (e.g., a screen-capture) of the graphical user interface which shows the intended result of the step. However, with respect to an On-line Help System, documentation which provides result descriptions for procedures and steps of procedures lengthens the content displayed in a topic window, and takes up too much of the visual area perceived by a user. Usability studies have shown that users do not like to scroll through more than three screens of information. Screens beyond three are likely to be ignored. Topic windows, lengthened by procedural results, compel users to scroll through either a long screen or several screens of information that some users may consider irrelevant. By the time a user has reviewed the extensive help information, closed the help window and returned to the main screen, the user may have forgotten the gist of the procedure. Users face a similar problem when software provides lengthy warnings associated with a step or procedure.

Although result and warning displays may provide useful information within the On-line Help System—particularly if the hard copy documentation has been lost or misplaced—every user may not want, or need, to access them. Users who already have experience with the program may not require the additional information. Other users may simply not want to be bothered with non-essential information.

SUMMARY OF THE INVENTION

In accordance with this invention, the above problem and concerns have been solved by embedding activation entities, such as bit-mapped images of result or warning buttons, in a topic window containing on-line textual procedures of an On-line Help System when the display of a result or warning may be helpful to a user.

If the user is interested in viewing the result or warning, the user may click on the activation entity with a pointing device, such as mouse. Clicking the pointing device on the activation entity causes the desired information to display in either another topic window or a pop-up. Once the information has been reviewed by the user, the activated window can be closed to restore the primary help window.

The foregoing and other features, utilities and advantages of the invention will be apparent from the following more particular description of a preferred embodiment of the invention as illustrated in the accompanying object code listing and in the drawings.

DETAILED DESCRIPTION OF PREFERRED EMBODIMENTS

The embodiments of the invention described herein may be implemented as logical operations in a distributed processing system having client and server computing systems. The logical operations of the present invention are implemented (1) as a sequence of computer implemented steps running on the computing system and (2) as interconnected machine modules within the computing system. The implementation is a matter of choice that is dependent on the performance requirements of the computing system implementing the invention. Accordingly, the logical operations making up the embodiments of the invention described herein are referred to variously as operations, steps or modules.

Figure 1:
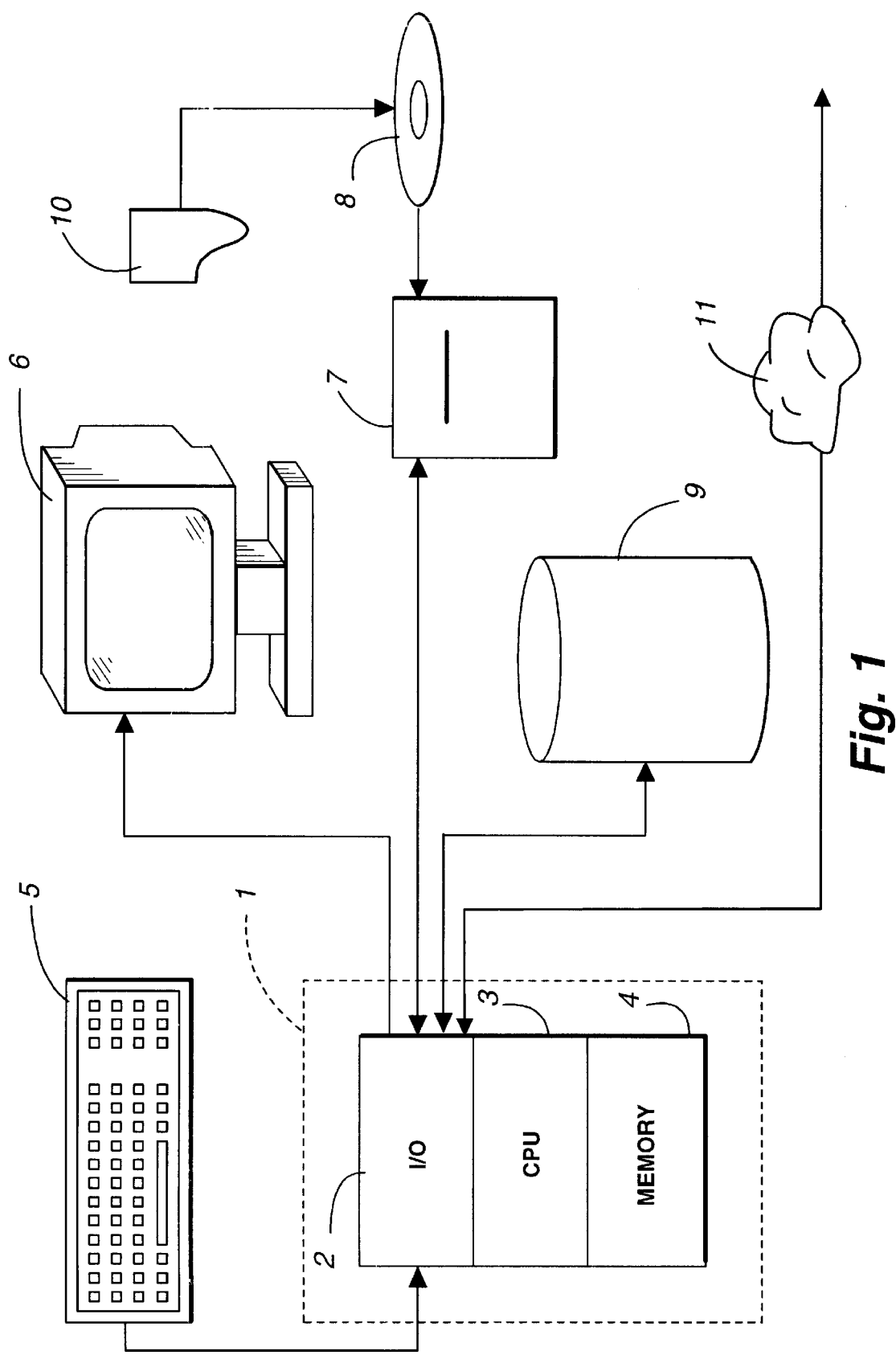
FIG. 1 is a block diagram of a representational computing system and operating environment for performing the computer implemented steps of the method in accordance with the invention.

The environment in which the present invention is used encompasses the general distributed computing system, wherein general purpose computers, workstations or personal computers are connected via communication links of various types, in a client-server arrangement, wherein programs and data, many in the form of objects, are made available by various members of the system for execution and access by other members of the system. Some of the elements of a general purpose workstation computer are shown in FIG. 1, wherein a processor 1 is shown, having an input/output ("I/O") section 2, a central processing unit ("CPU") 3 and a memory section 4. The I/O section 2 may be connected to a keyboard 5, a display unit 6, a disk storage unit 9, a CDROM drive or unit 7 or a computer network 11 such as a wide area network ("WAN"), local area network ("LAN") or other network connection such as the Internet. The CDROM unit 7 can read a CDROM or CDROM medium 8 which typically contains programs 10 and data. The computer program products containing mechanisms to effectuate the apparatus and methods of the present invention may reside in the memory section 4, or on a disk storage unit 9 or on the CDROM a or network 11 of such a system. Examples of such systems include SPARC systems offered by Sun MicroSystems, Inc., personal computers offered by IBM Corporation and by other manufacturers of IBM-compatible personal computers, and systems running the UNIX® operating system.

As Microsoft Windows-based applications form a significant portion of the personal computer industry, this invention will be described in the context of an On-line Help System as it exists within a Microsoft Windows environment.

In order to create a results-oriented On-line Help System, certain activation entities are programmed to appear within a topic window of the On-line Help System. In a preferred embodiment of the invention, such an entity is a bit-mapped image which may be labeled "RESULT" if the result of a procedural step is to be displayed or "WARNING" or merely "!" if a warning for a procedural step is to be displayed. In a Windows environment, specially designed bit-mapped activation entities are saved as files having a .BMP extension. However, pre-formatted buttons available to the Windows application developer or "hot text" may also be used as the activation entity.

The user can choose whether or not to click a pointing device on the activation entity. Clicking the activation entity with the pointing device causes the On-line Help System to call the help engine which, in turn, displays the desired information in either a topic window or a pop-up in accordance with the file format. In a preferred embodiment of the invention, the On-line Help System is programmed to display a pop-up when the user clicks on the result or warning activation entity with a pointing device.

Figure 2:
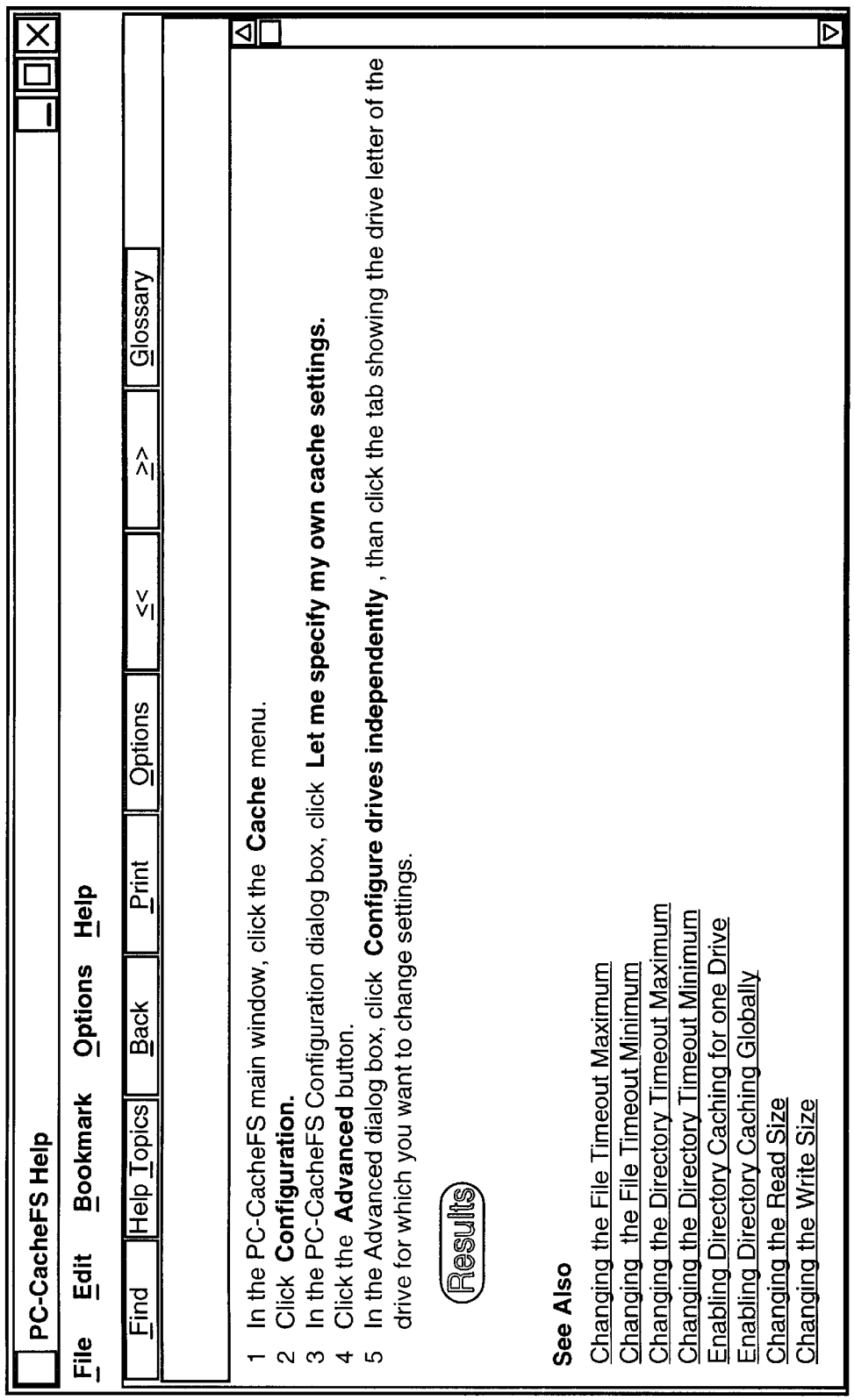
FIG. 2 is a monochrome laser printout of a topic window within an On-line Help System having an activation entity in the form a bit-mapped "results" button, said button not yet having been clicked on with a pointing device.

FIG. 2 is a printout of a primary topic window for a Windows On-line Help System written for a program titled PC-CacheFS by Sun MicroSystems, Inc. This topic window is titled "Enabling Directory Caching". A smaller-sized, but fully functional secondary topic window, having a different appearance but the same functionality as the primary topic window displays as an overlay of the right side of the primary topic window. This secondary topic window, titled "Changing Advanced Settings for One Drive", contains an activation entity in the form of a "result" button, which may be clicked with a pointing device.

Figure 3:
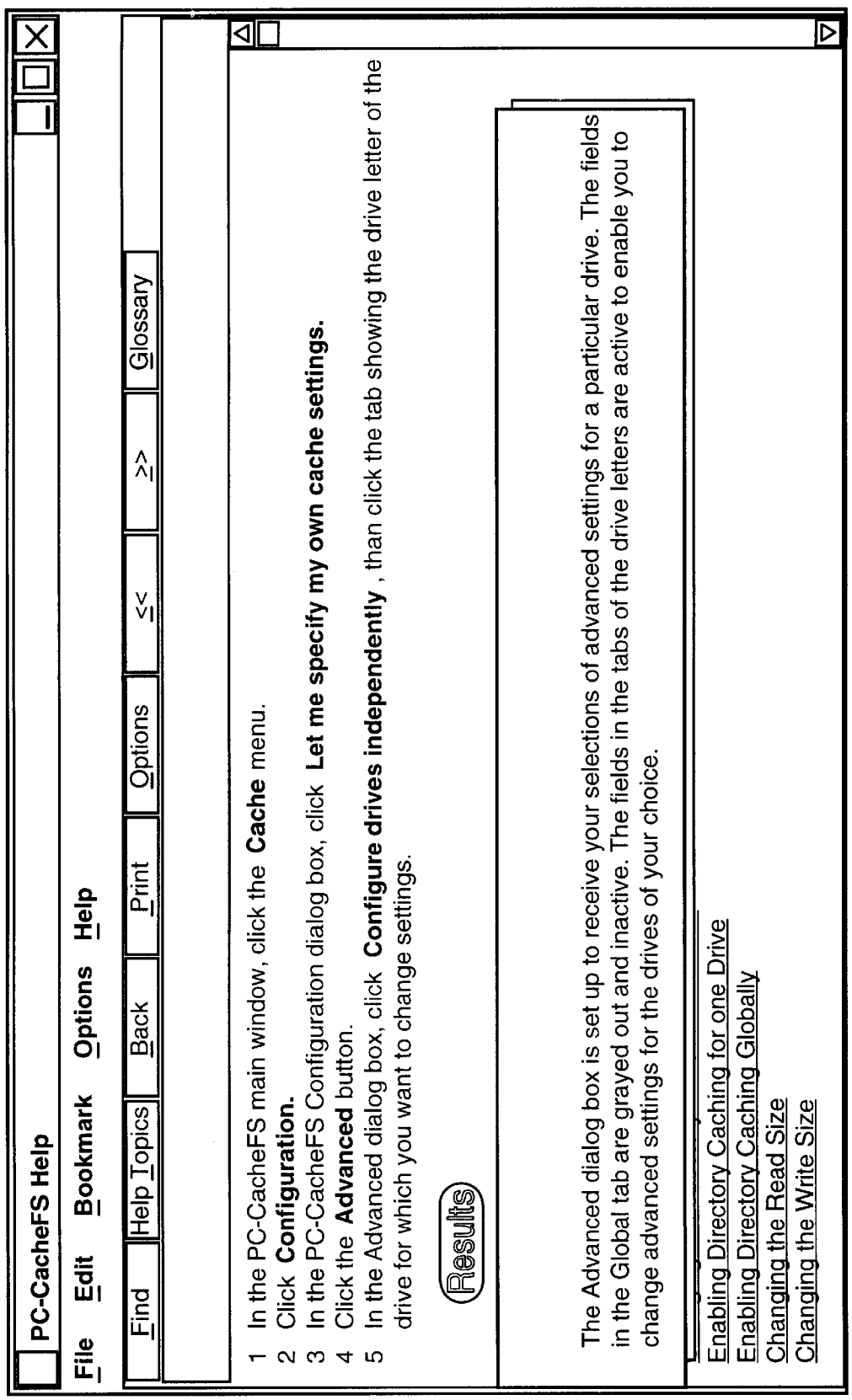
FIG. 3 is a monochrome laser printout of the topic window of FIG. 2 after the "results" button has been clicked on with a pointing device, and a pop-up has been displayed.

FIG. 3 depicts the result of clicking the result button of FIG. 2. A pop-up displays, overlying portions of both the primary topic window and secondary topic window. The pop-up, titled "Result" contains a written description of the result expected when drives are configured independently.

Figure 4:
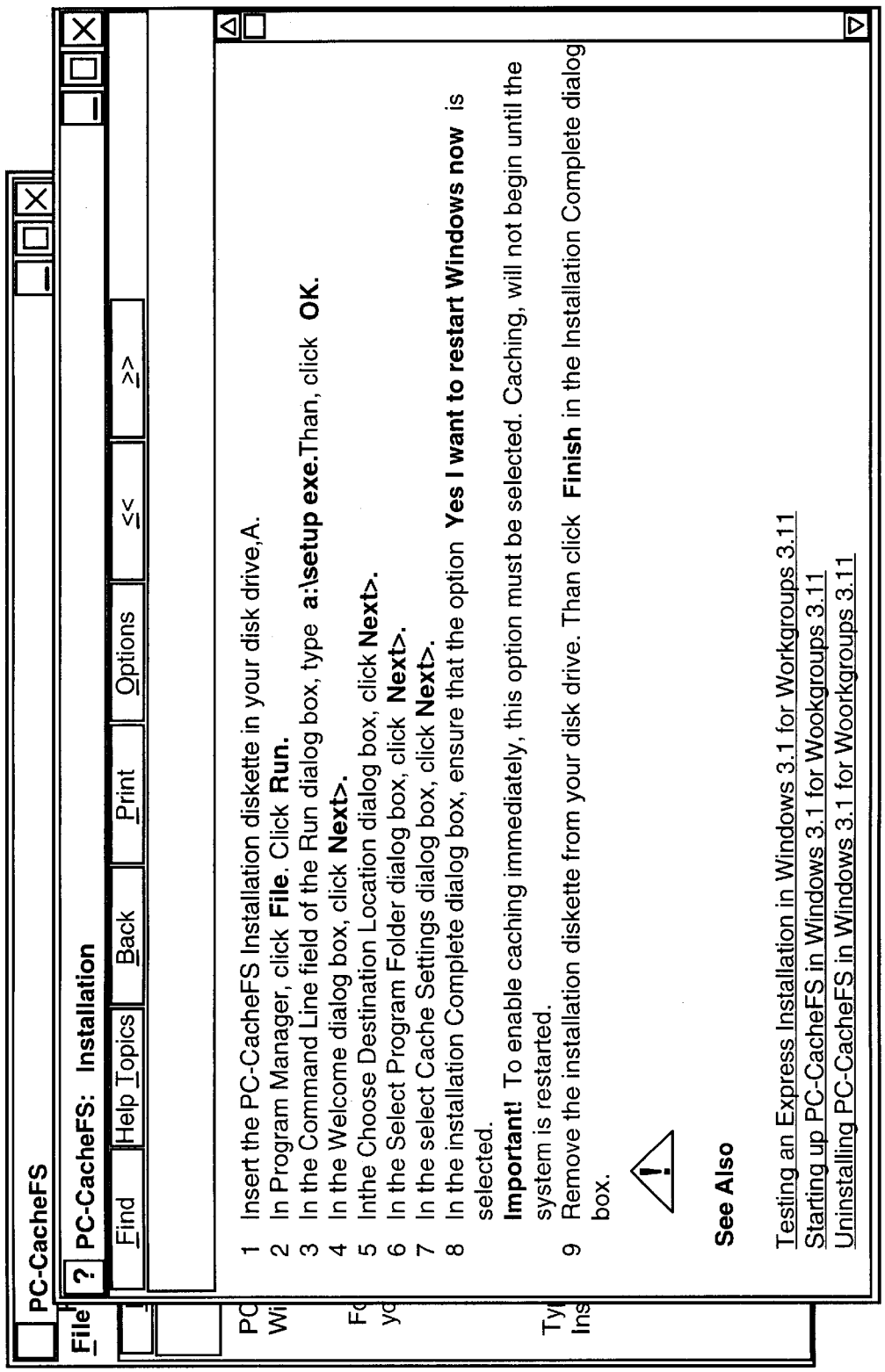
FIG. 4 is a monochrome laser printout of a topic window within an On-line Help System having an activation entity in the form of a "warning" button, said button not yet having been clicked on with a pointing device.

FIG. 4 depicts the printout of another primary topic window of the PC-CacheFS On-line Help Systems. The title of this primary topic window is "Installing PC-CacheFS". A secondary, fully-functional topic window titled "Express Installation in Windows 3.1 and Windows for Workgroups 3.11" overlies the right side of the primary topic window "Installing PC-CacheFS". In this secondary window is a warning button in the shape of a triangle displaying the exclamation mark character (!). Like the previous result button, this warning button may be clicked with a pointing device.

Figure 5:
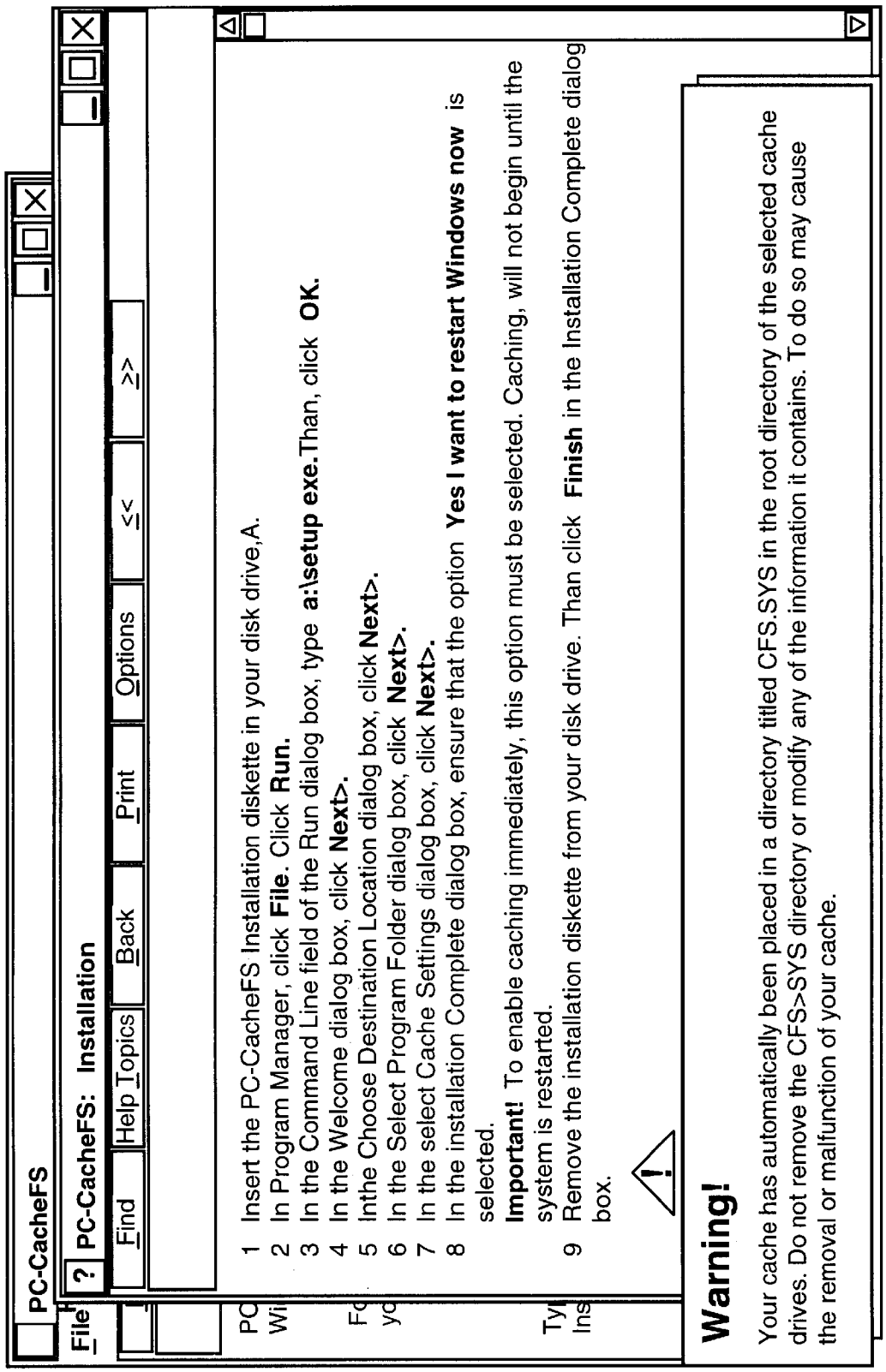
FIG. 5 is a monochrome laser printout of the topic window of FIG. 4 after the "warning" button has been clicked on with a pointing device, and a pop-up has been displayed.

FIG. 5 depicts the result of clicking the warning button of FIG. 3. A pop-up displays, overlying portions of both the primary topic window and the secondary topic window of FIG. 4. The pop-up, which is titled "Warning!" contains a written warning that identifies the destination directory of the established cache file as the root directory, and also indicates the potential consequences of removing the cache file from the root directory or modifying that file.

Results-oriented help information as shown and described above, provides useful information to the user who may or may not need such information, without cluttering the display screens and decreasing productivity for users who do not need the information.

In addition to the example described above, the information regarding the expected result of a procedural step may be provided as a screen capture of an actual non-help related program window display as it would appear following execution of the procedural step, rather than as a textual description of While the invention has been particularly shown and described with reference to a preferred embodiment thereof, it will be understood by those skilled in the art that various changes in the form and details may be made therein without departing from the spirit and scope of the invention. For example, topic windows may be used in place of pop-ups to provide results and warnings to the user. In addition, the invention may be easily adapted for use in other GUI environments.

What is claimed is:

1. A method encoded in the form of binary program instructions for making available to a user, in a graphical user interface environment, information related to an expected result of a procedural step prior to executing the step on a computing system, said method comprising the steps of:

(a) displaying a first help window having an activation entity displayed thereon;

(b) displaying a second help window which appears and at least partially displaces the first help window in response to the user clicking on said activation entity with a pointing device, said second help window containing information regarding the expected result, wherein the information regarding the expected result is provided as a screen capture of a window display as it would appear following execution of the procedural step rather than as a textual description of the expected result of the procedural step; and (c) clearing the second help window and restoring the first help window in response to user provided input through said pointing device.

2. The method of claim 1, wherein the information regarding the expected result is provided as a textual description.

3. The method of claim 1, wherein said activation entity is a bit-mapped image.

4. The method of claim 3, wherein said bit-mapped image includes a label titled "RESULT".

5. The method of claim 1, wherein the information regarding the expected result is a warning.

6. The method of claim 1, wherein both said first and second help windows are topic windows.

7. The method of claim 1, wherein said first help window is a topic window and said second help window is a pop-up window.

8. A computer implemented process for making available to a user, in a graphical user interface environment, information related to an expected result of a procedural step prior to executing the step on a computer system, said method comprising the steps of:

(a) displaying a first help window having an activation entity displayed thereon;

(b) displaying a second help window which appears and at least partially displaces the first help window in response to the user clicking on said activation entity with a pointing device, said second help window containing information regarding the expected result, said information regarding the expected result being a screen capture of a window display as it would appear following execution of the procedural step rather than as a textual description of the expected result of the procedural step; and (c) clearing the second help window and restoring the first help window in response to user provided input through said pointing device.

9. The process of claim 8, wherein the information regarding to the expected result is provided as a textual description.

10. The process of claim 8, wherein said activation entity is a bit-mapped image.

11. The process of claim 10, wherein said bit-mapped image includes a label titled "RESULT".

12. The process of claim 8, wherein the information regarding to the expected result is a warning.

13. The process of claim 8, wherein both the first and second help windows are topic windows.

14. The process of claim 8, wherein said first window is a topic window and said second window is a pop-up window.

15. A computer program product comprising:

a computer usable medium having computer readable code embodied therein for making available to a user in a graphical user interface environment information related to an expected result of a procedural step prior to executing the step on a computer system, the computer program product further comprising:

computer readable program code devices configured to cause a computer to effect displaying a first help window having an activation entity displayed thereon;

computer readable program code devices configured to cause a computer to effect displaying a second help window which appears and at least partially displaces the first help screen in response to the user clicking on said activation entity with a pointing device, said second help screen containing information regarding the expected result; computer readable program code devices configured to cause a computer to effect providing the information regarding the expected result as a graphic representation of an actual screen as such screen would appear following execution of the procedural step rather than as a textual description of the expected result of the procedural step;

and computer readable program code devices configured to cause a computer to effect clearing the second help window and restoring the first help window in response to user provided input through said pointing device.

16. The computer program product of claim 15, wherein said computer program product further comprises computer readable program code devices configured to cause a computer to effect providing the information regarding to the expected result as a textual description.

17. The computer program product of claim 15, wherein said computer program product further comprises computer readable program code devices configured to cause a computer to effect representation of the activation entity as a bit-mapped image.

18. The computer program product of claim 15, wherein said computer program product further comprises computer readable program code devices configured to cause a computer to effect a warning as the information regarding the expected result.

19. A graphic user interface providing help to a computer user during the running of an application program on a computer, the graphic user interface comprising a plurality of computer readable code devices that operate to make available to the computer user, result information relative to a result that would be accomplished by a given user-initiated application program step, the result information being provided to the computer user prior to the computer user actually executing the given application program step:

first computer readable code devices configured to cause the computer to display a help screen relating to the given application program step, the help screen having a result icon displayed thereon for selection by the computer user;

second computer readable program code devices configured to cause the computer to display a result screen which at least partially displaces the help screen;

the result screen being displayed in response to the computer user using a pointing device to select the result icon that is displayed on the help screen;

the result screen containing the information relative to the result that would be accomplished by the given application program step:

third computer readable program code devices configured to cause the computer to provide the information relative to the result that would be accomplished by the given application program step as a graphic representation of a application program screen as it would appear following execution of the given application program step rather than as a textual description of the expected result of the procedural step; and fourth computer readable program code devices configured to cause the computer to clear the result screen and to restore the help screen in response to the compute user using the pointing device to provide an input to the computer.

\* \* \* \* \*